No. 886,419. PATENTED MAY 5, 1908.
O. SELG.
FAN.
APPLICATION FILED DEC. 18, 1907.
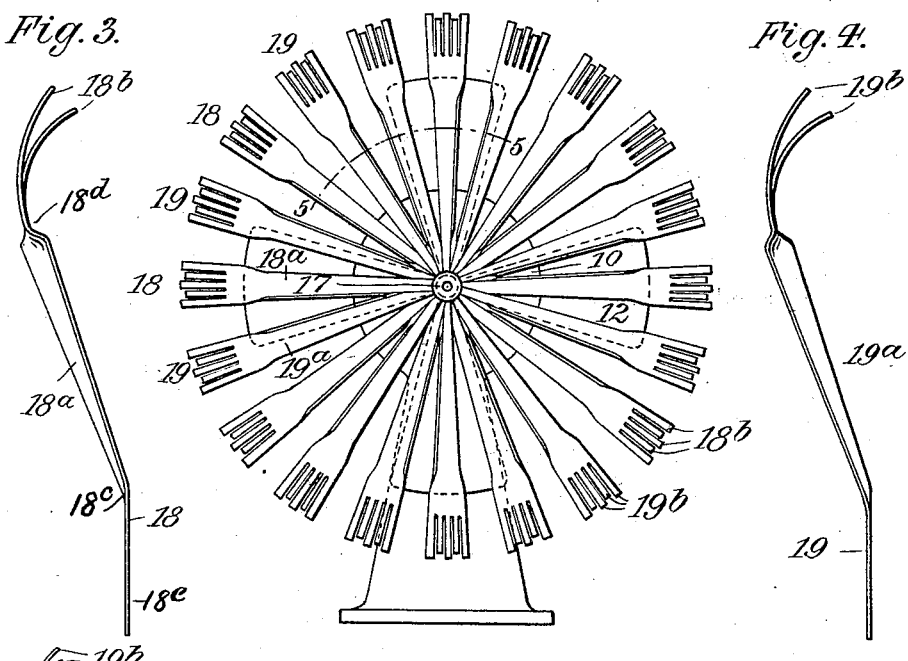
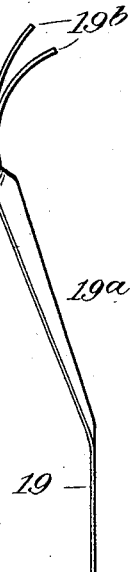
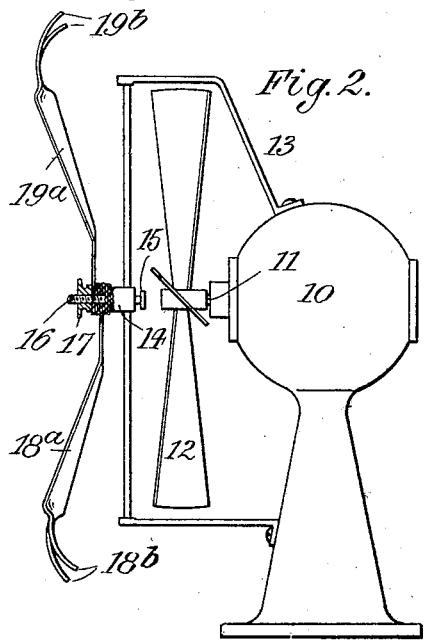
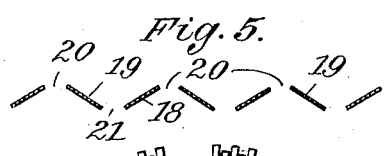
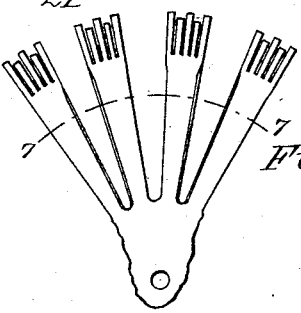
Witnesses:
Arthur E. Zumpe
August Kiner
Inventor
Otto Selg
By his Attorney
THE NORRIS PETERS CO., WASHINGTON, D. C.

UNITED STATES PATENT OFFICE.

OTTO SELG, OF NEW YORK, N. Y.

FAN.

No. 886,419.     Specification of Letters Patent.     Patented May 5, 1908.

Application filed December 18, 1907. Serial No. 406,993.

*To all whom it may concern:*

Be it known that I, OTTO SELG, a citizen of the United States, residing at New York city, Manhattan, county and State of New York, have invented new and useful Improvements in Fans, of which the following is a specification.

This invention relates to a fan which is so constructed that it will distribute air blasts in various directions over a large area.

In the accompanying drawing: Figure 1 is a front elevation of a fan embodying my invention; Fig. 2 a side view thereof; Figs. 3 and 4 are side views of a pair of adjoining air deflecting blades; Fig. 5 is a cross section on line 5—5, Fig. 1, laid out in a plane; Fig. 6 a front view of part of an air deflector, showing a modification of the invention, and Fig. 7 a cross section on line 7—7, Fig. 6, laid out in a plane.

In the housing 10 of a fan is journaled the shaft 11 of the vanes 12 driven preferably by electricity in the usual manner. To housing 10 is secured a frame 13 provided with a socket 14 clamped thereto by set screw 15. This socket has a forwardly extending screw-stem 16, to which the deflector is secured by nut 17.

The deflector consists of a series of radial blades 18 alternating with similar blades 19. The body of each blade 18 is provided with a first twist $18^c$, near its inner end and a second reversed twist $18^d$, near its outer end. In this way each blade is composed of an inner section $18^e$, a central section $18^a$, and an outer section $18^b$, of which the inner straight section $18^e$, is perforated for the reception of stem 16. Central section $18^a$, inclines forwardly from section $18^e$, and by its lateral twist presents an oblique face to the source of the air blast. Outer section $18^b$, is slitted longitudinally to form a series of fingers which are curved backwards from section $18^a$ at different radii. In this way section $18^b$, constitutes a slitted trough of varying depth that directly faces the air blast.

Blades 19 are made in all respects like blades 18, with the exception that the central or inclined sections $19^a$, of blades 19 are set or twisted in opposite directions from the corresponding sections $18^a$, of blades 18. Thus, while all the sections $18^a$, of blades 18 are twisted to the left, sections $19^a$, of blades 19 are twisted to the right.

By the construction described, the air is ejected in powerful diverging blasts through the openings 20 formed between the outer edges of the blade-sections $18^a$, $19^a$, while it will flow in a substantial axial direction through the openings 21 formed between the inner edges of said blade-sections. In this way a wide diffusion of the blast is obtained. The outer curved ends $18^b$, $19^b$, of the blades form the spaced members of a common rearwardly facing trough or pocket which directs the outer strata of the air sidewise and backwards to increase the extent of the area cooled.

In Figs. 1–5, the blades 18, 19, are separated from each other, so that the distance between them may be adjusted, while in Figs. 6 and 7, all blades are made integral.

I claim:

A fan provided with a deflector composed of a series of radial blades having an inner transverse twist and an outer reversed transverse twist, to form an inner straight section, a central oblique section and an outer rearwardly curved section, the central sections of adjoining blades being set in opposite directions, substantially as specified.

Signed by me at New York city, (Manhattan,) N.Y., this 17th day of December, 1907.

OTTO SELG.

Witnesses:
   W. R. SCHULZ,
   FRANK V. BRIESEN.